Patented Oct. 19, 1937

2,096,095

UNITED STATES PATENT OFFICE 2,096,095

METHOD OF MAKING ENAMEL PAINTS

George E. Finn, Cleveland, Ohio, assignor to The Sherwin-Williams Company, Cleveland, Ohio, a corporation of Ohio No Drawing. Application March 2, 1934, Serial No. 713,775

1 Claim. (Cl. 134—51)

This invention relates to a novel method of producing enamel paints of varying composition and adapted for different uses.

In the various methods of making enamel paints, that have been in commercial use, it has been customary to mix the pigment materials with suitable plasticizers to form a paste and then mix this paste with a suitable varnish, prepared in a varnish plant, the required volatile solvents or thinners being added to produce the enamel paint in condition to be used.

While enamel paints made by the processes now in use have been satisfactory as to quality, they have been relatively costly on account of the expense involved in the manufacture of the varnish. It is the object of my invention to prepare varnish or enamel paints, of the highest quality, in a simple manner in which the final product is produced by introducing all of the components into a single apparatus in which the process is carried out, thereby effecting great economies in the cost of manufacture.

The apparatus which I prefer to use is a mill of the rotating type in which dispersion is effected by the action of falling balls, pebbles or rods contained therein. Into this mill I pour or let flow a weighed quantity of selected oil or plasticizer, also a weighed quantity of selected volatile solvent, a weighed quantity of the resin which is to be incorporated with the oil to make the enamel vehicle, and a weighed quantity of pigment. By varying the proportions of the ingredients it is possible to prepare enamel paints of widely varying properties.

The oils, resins and solvents used in my process may consist of such materials as have long been used in the industry; yet my process can be used equally well with some of the newer synthetic resins along with suitable solvents and plasticizers. For the successful carrying on of this process it is essential that knowledge should be had as to compatibility or incompatibility of the ingredients to be employed and in each individual batch only satisfactorily compatible ingredients should be used.

In the processes heretofore practised in the making of enamel paints the varnish used has generally been a very expensive item. The varnish may have been purchased from another manufacturer or may have been made in another department of the paint manufacturer's plant. In either event an installation for the manufacture of varnish has usually been expensive. A plant with melting rooms, thinning rooms, filter presses and storage tanks for the aging of varnish requires much capital and skilled operatives must be employed. Also, the fire hazard is great and insurance rates are high.

In the making of enamel paints by my process much of this investment of capital is unnecessary and a large part of the expense is avoided. Varnish fires, varnish kettles, thinning rooms, filter presses, and varnish storage tanks are not needed. Only a few storage tanks are needed for the storage of oils and thinners and rooms or bins for the storage of pigments, resins and drums containing solvents and plasticizers.

Some of the common resins of commerce such as colophony, damar, elemi, gilsonite and ester resins are soluble in linseed oil, spirits of turpentine, petroleum spirit, coal tar hydrocarbons, etc. while the so-called fossil resins such as Kauri, Congo, Manila, Zanzibar, etc., also the harder asphalts, are not usually soluble in the mentioned solvents unless they have been pyrolyzed. However, these pyrolyzed resins are now readily obtainable as commercial products, and by their use it is possible to produce a wide range of enamel paints.

The following examples of formulation illustrate the different types of enamel or varnish paint which may be made by my process, but I am not limited to these specific formulae nor do I claim any specific formula.

Flat black baking enamel

| | Pounds |
|---|---|
| Carbon black | 32 |
| Diatomaceous earth | 30 |
| Colophony | 122 |
| Mineral spirits | 18 |

These are introduced into a mill of the type described and rotated for about 36 hours.

Then add:

| | | |
|---|---|---|
| Heavy bodied linseed oil | gals | 8 |
| Heavy bodied tung oil | gals | 8 |
| Mineral spirits | gals | 4 |
| Colophony cured with lime | lbs | 50 |
| Kerosene | gals | 35 |

Continue rotation for another hour.

Black frame enamel

| | | |
|---|---|---|
| Gilsonite | lbs | 68 |
| Colophony | lbs | 22 |
| Carbon black | lbs | 33 |
| Mineral spirits | gals | 33 |

These are introduced into a mill of the type described and rotated for about 24 to 36 hours. Then add:

| | Gallons |
|---|---|
| Heavy bodied linseed oil | 14 |
| Heavy bodied tung oil | 4 |
| Mineral spirits | 36 |
| Liquid drier | 3 |

Continue rotation for another hour.

Quick drying primer surfacer

| | | |
|---|---|---|
| Iron oxide | lbs | 444 |
| Lithopone | lbs | 214 |
| Whiting | lbs | 36 |
| Zinc stearate | lbs | 50 |
| East India gum | lbs | 50 |
| Linseed oil | gals | 13½ |
| Castor oil | gals | 1½ |
| Creosote oil | gals | 32 |

These are introduced into a mill of the type described and rotated for about 24 to 36 hours. Then add:

| | Gallons |
|---|---|
| Mineral spirits | 30 |
| Liquid drier | 1½ |

Continue rotation for another hour.

Traffic zone white

| | | |
|---|---|---|
| Titanium dioxide | lbs | 104 |
| Barytes | lbs | 326 |
| East India gum | lbs | 205 |
| Tung oil | gals | 8 |
| Butyl alcohol | gals | 9 |
| Methyl acetone | gals | 18 |
| Denatured alcohol | gals | 17½ |

These are introduced into a mill of the type described and rotated for about 24 hours.

White enamel

| | Pounds |
|---|---|
| Titanium dioxide | 93 |
| Antimony trioxide | 11 |
| Vinyl resin | 160 |
| Dibutyl cellosolve phthalate | 12 |
| Tricresyl phosphate | 38 |
| Blown castor oil | 1 |
| Hexone | 275 |
| Toluol | 275 |
| Butyrone | 67 |
| Xylol | 68 |

These are introduced into a mill of the type described and rotated for about 24 to 36 hours.

White enamel

| | Pounds |
|---|---|
| Titanium dioxide | 100 |
| Zinc sulfide | 100 |
| Mowilith resin | 48 |
| Butyl acetate | 70 |
| Butyl alcohol | 10 |
| Xylol | 67 |
| Dibutyl phthalate | 5 |

These are introduced into a mill of the type described and rotated for about 24 to 36 hours.

If consistency is too thick for some purposes, it may be reduced with xylol.

Having thus described my invention, I claim:

The hereindescribed method of making enamel paints which consists in aggregating the pigment material and resin components of the paint with suitable solvent and plasticizing materials to form a batch to be processed, then subjecting the batch to the grinding and mixing action of falling bodies in a rotating mill for a sufficient time to produce a liquid in which the various components are uniformly dispersed, and thereafter combining and thoroughly mixing with said liquid suitable volatile solvents to complete the product and adapt it for use as an enamel paint.

GEORGE E. FINN.